(12) United States Patent
Gao et al.

(10) Patent No.: US 7,724,469 B2
(45) Date of Patent: May 25, 2010

(54) HIGH FREQUENCY FIELD ASSISTED WRITE DEVICE

(75) Inventors: Kaizhong Gao, Eden Prairie, MN (US);
Haiwen Xi, Prior Lake, MN (US);
Yiming Shi, Maple Grove, MN (US);
Sining Mao, Eden Prairie, MN (US);
Patrick J. Ryan, St. Paul, MN (US);
Song S. Xue, Edina, MN (US);
Shaoping Li, Naperville, IL (US)

(73) Assignee: Seagate Technology LLC, Scotts Valley, CA (US)

( * ) Notice: Subject to any disclaimer, the term of this patent is extended or adjusted under 35 U.S.C. 154(b) by 673 days.

(21) Appl. No.: 11/634,767

(22) Filed: Dec. 6, 2006

(65) Prior Publication Data

US 2008/0137224 A1 Jun. 12, 2008

(51) Int. Cl.
*G11B 5/127* (2006.01)
*G11B 5/187* (2006.01)

(52) U.S. Cl. ............... 360/125.3; 360/128; 360/125.71

(58) Field of Classification Search ................. 360/128, 360/125.3, 125.31, 125.71, 125.74
See application file for complete search history.

(56) References Cited

U.S. PATENT DOCUMENTS

| | | | |
|---|---|---|---|
| 5,695,864 A | 12/1997 | Slonczewski | |
| 6,785,092 B2 | 8/2004 | Covington et al. | |
| 6,809,900 B2* | 10/2004 | Covington | 360/125.01 |
| 6,980,469 B2* | 12/2005 | Kent et al. | 365/171 |
| 7,492,550 B2* | 2/2009 | Samofalov et al. | 360/125.01 |
| 2005/0023938 A1 | 2/2005 | Sato et al. | |
| 2006/0090178 A1 | 4/2006 | Stipe | |
| 2006/0187580 A1* | 8/2006 | Samofalov et al. | 360/125 |
| 2006/0198047 A1 | 9/2006 | Xue et al. | |
| 2007/0030728 A1* | 2/2007 | Kent et al. | 365/171 |
| 2008/0019040 A1* | 1/2008 | Zhu et al. | 360/110 |
| 2008/0112087 A1* | 5/2008 | Clinton et al. | 360/317 |
| 2008/0117545 A1* | 5/2008 | Batra et al. | 360/125.01 |
| 2008/0218891 A1* | 9/2008 | Gubbins et al. | 360/59 |
| 2008/0225435 A1* | 9/2008 | Hou et al. | 360/110 |
| 2008/0304176 A1* | 12/2008 | Takagishi et al. | 360/86 |
| 2008/0316643 A1* | 12/2008 | Linville et al. | 360/110 |
| 2009/0002883 A1* | 1/2009 | Ionescu et al. | 360/110 |
| 2009/0002895 A1* | 1/2009 | Pust et al. | 360/319 |
| 2009/0052095 A1* | 2/2009 | Yamada et al. | 360/324 |
| 2009/0059423 A1* | 3/2009 | Yamada et al. | 360/122 |

(Continued)

OTHER PUBLICATIONS

"Write Field Analysis and Write Pole Design in Perpendicular Recording", Gao et al., *IEEE Transactions on Magnetics*, vol. 38, No. 5, Sep. 2002, pp. 3521-3527.

(Continued)

*Primary Examiner*—William J Klimowicz
(74) *Attorney, Agent, or Firm*—Kinney & Lange, P.A.

(57) ABSTRACT

A magnetic writer includes a write element and an oscillation device disposed adjacent to the write element. The first oscillation device includes a first magnetic layer, a second magnetic layer having a magnetization vector including a component perpendicular to a major plane of the first magnetic layer. The first nonmagnetic layer disposed between the first magnetic layer and the second magnetic layer. The first oscillation device generates a high-frequency oscillation field when a current is directed perpendicular to the major plane of the first magnetic layer.

20 Claims, 5 Drawing Sheets

U.S. PATENT DOCUMENTS

2009/0080105 A1*  3/2009  Takashita et al. ............... 360/75
2009/0080106 A1*  3/2009  Shimizu et al. ............... 360/75
2009/0080120 A1*  3/2009  Funayama et al. .......... 360/319

OTHER PUBLICATIONS

"Magnetic Recording Configuration for Densities Beyond 1 Tb/in$^2$ and Data Rates Beyond 1 Gb/s", Gao et al., *IEEE Transactions on Magnetics*, vol. 38, No. 6, Nov. 2002, pp. 3675-3683.

"Fast Switching in a Single-domain Particle Under sub-Stoner-Wohlfarth Switching Fields", Gao et al., *Applied Physics Letters*, vol. 81, No. 21, Nov. 18, 2002, pp. 4008-4010.

"Transition Jitter Estimates in Tilted and Conventional Perpendicular Recording Media at 1 Tb/in$^2$" Gao et al., *IEEE Transactions on Magnetics*, vol. 39, No. 2, Mar. 2003, pp. 704-709.

"Energy Surface Model of Single Particle Reversal in sub-Stoner-Wohlfarth Switching Fields", Gao et al., *Journal of Applied Physics*, vol. 93, No. 10, May 15, 2003, pp. 6549-6551.

"Track Edge Effects in Tilted and Conventional Perpendicular Recording" Gao et al., *Journal of Applied Physics*, vol. 93, No. 10, May 15, 2003, pp. 7840-7842.

"Large-angle, Gigahertz-rate Random Telegraph Switching Induced by Spin-momentum Transfer", Pufall, et al., *Physical Review B 69*, 2004, 214409, pp. 1-5.

"Dynamic Switching in Tilted and Conventional Perpendicular Recording Media", Gao et al., *Journal of Applied Physics*, vol. 96, No. 12, Dec. 15, 2004, pp. 7753-7755.

"Injection Locking and Phase Control of Spin Transfer Nano-oscillators", Rippard et al., *Physical Review Letters*, 95, 067203, Aug. 5, 2005, pp. 1-4.

"Mutual Phase-locking of Microwave Spin Torque Nano-oscillators", Kaka et al., *Nature Letters*, vol. 437, Sep. 15, 2005, pp. 389-392.

"Phase-locking in double-point-contact Spin-transfer Devices", Mancoff et al., *Nature letters*, vol. 437, Sep. 15, 2005, pp. 393-395.

"Spin Angular Momentum Transfer in Current-perpendicular Nanomagnetic Junctions", Sun, *IBM J. Res. & Dev.*, vol. 50, No. 1, Jan. 2006, pp. 81-100.

* cited by examiner

HIGH FREQUENCY FIELD ASSISTED WRITE DEVICE

BACKGROUND OF THE INVENTION

The present invention relates to magnetic devices. More particularly, the present invention relates to a magnetic device that employs a high frequency oscillating field.

Two general techniques for magnetically recording information on a storage medium include longitudinal recording and perpendicular recording. In longitudinal recording, the direction of the magnetization in a plane of the storage medium is altered in a manner to store information. In perpendicular recording, the magnetization of the storage medium is altered in a direction that is perpendicular to the plane of the medium. With the magnetization direction perpendicular to the plane of the medium as opposed to parallel with the plane, information can be stored at higher density.

There has been an ongoing effort to increase the bit densities in magnetic recording. Bit density refers to the number of bits that can be written to the storage medium in a given length, area, or volume. The size of such a flux transition is related to the size and focus of a magnetic write field generated by a magnetic head. One traditional type of magnetic head is known as an inductive head, which uses a current passed through a coil of wire. This causes a magnetic field to be generated at the pole tip or tips of the head that is used to write data to the magnetic medium.

There is also an ongoing effort to use magnetic storage media that have a high coercivity. This type of media requires stronger and a more focused write field to impress a flux reversal. One approach to providing a stronger write field is to incorporate a device adjacent to the tip of the write pole that produces a magnetic field to reduce the coercivity of the magnetic medium near the write pole. This allows data to be written to the high coercivity medium with a lower magnetic field from the write pole. However, many current designs of such write assist devices consume high levels of power to generate the assist field, and the frequency of the assist field produced by these write assist devices is not easily controlled.

BRIEF SUMMARY OF THE INVENTION

The present invention relates to a magnetic writer that includes a write element and an oscillation device disposed adjacent to the write element. The first oscillation device includes a first magnetic layer, a second magnetic layer having a magnetization vector including a component perpendicular to a major plane of the first magnetic layer. The first nonmagnetic layer disposed between the first magnetic layer and the second magnetic layer. The first oscillation device generates a high-frequency oscillation field when a current is directed perpendicular to the major plane of the first magnetic layer.

DETAILED DESCRIPTION

Figure 1:
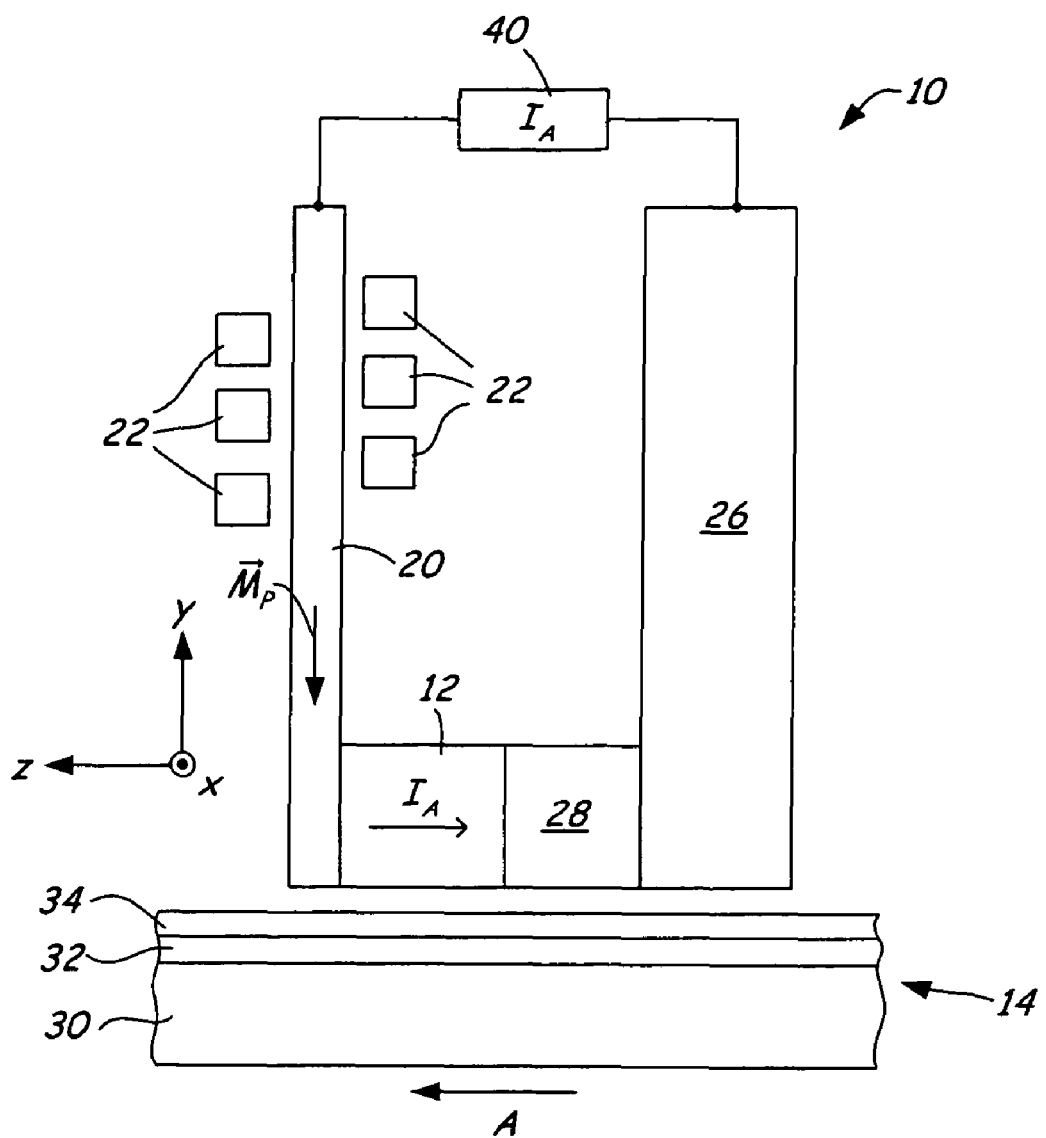
FIG. 1 is a side view of a magnetic writer including a write pole and an oscillation element for providing a write assist field disposed relative to a magnetic medium.

FIG. 1 is a side view of magnetic writer 10 including write assist device 12 disposed proximate to magnetic medium 14. Magnetic writer 10 includes write pole 20, conductive coils 22, and shield 26. Write pole 20 is connected to front shield 26 at the surface of magnetic medium 14 by write assist device 12 and non-magnetic conductor 28. Conductive coils 22 surround write pole 20 such that turns of conductive coils 22 are disposed in the gap between write pole 20 and shield 26.

Magnetic writer 10 is carried over the surface of magnetic medium 14, which is moved relative to magnetic writer 10 as indicated by arrow A such that write pole 20 trails shield 26 and is used to physically write data to magnetic medium 14. Conductive coils 22 surround write pole 20 such that, when a write current is caused to flow through conductive coils 22, the magnetomotive force in the coils magnetizes write pole 20 with a magnetization $M_p$. This causes a write field to be generated through the medium confronting surface of write pole 20, which is used to write data to magnetic medium 14. The direction of the write field at the medium confronting surface of write pole 20, which is related to the state of the data written to magnetic medium 14, is controllable based on the direction that the write current that flows through conductive coils 22.

Magnetic writer 10 is shown merely for purposes of illustrating a construction that may be used in conjunction with write assist device 12 of the present invention, and variations on the design may be made. For example, while write pole 20 includes a single layer of magnetic material, write pole 20 can also be comprised of a multiple layers of magnetic material, and/or a return pole may be incorporated to provide a dual pole writer configuration. In addition, magnetic writer 10 is configured for writing data perpendicularly to magnetic medium 14, but magnetic writer 10 and magnetic medium 14 may also be configured to write data longitudinally. Furthermore, a magnetic reader may be provided adjacent to and carried over magnetic medium 14 on the same device as magnetic writer 10.

Magnetic medium 14 includes substrate 30, soft underlayer (SUL) 32, and medium layer 34. SUL 32 is disposed between substrate 30 and medium layer 34. Magnetic medium 14 is positioned proximate to magnetic writer 10 such that the surface of medium layer 34 opposite SUL 32 faces write pole 20. In some embodiments, substrate 30 is comprised of a non-magnetic material, such as aluminum, aluminum based alloys, or glass, SUL 32 is comprised of a magnetically soft (i.e., high permeability) material, and medium layer 34 is comprised of a granular material having a high perpendicular anisotropy and high coercivity. Magnetic medium 14 is shown merely for purposes of illustration, and may be any type of medium that can be used in conjunction with magnetic writer 10, such as composite media, continuous/granular coupled (CGC) media, discrete track media, and bit-patterned media.

SUL 32 is located below medium layer 34 of magnetic medium 14 and enhances the amplitude of the write field produced by the write pole 20. The image of the write field is produced in SUL 32 to enhance the field strength produced in magnetic medium 14. As the write field from write pole 20 passes through medium layer 34, medium layer 34 is magnetized perpendicular to the medium plane to store data based on the write field direction. The flux density that diverges from write pole 20 into SUL 32 returns through return pole 26. Shield 26 is provided to limit the effect of magnetic writer 10 on adjacent magnetic devices (e.g., a magnetic reader).

In order to write data to the high coercivity medium layer 34 of magnetic medium 14 with a lower write field, a high frequency write assist field may be generated at magnetic medium 14 proximate to write pole 20. According to the Stoner-Wohlfarth model, the switching field limit of the uniformly magnetized grains in medium layer 34 may be expressed as:

$$h_{sw}(\theta) = \frac{1}{(\cos^{2/3}(\theta) + \sin^{2/3}(\theta))^{3/2}},$$ (Equation 1)

where $h_{sw}$, is the write field required to switch the magnetization direction of the grains in medium layer 34 and θ is the write field angle with respect to the easy axis anisotropy of the grains of medium layer 34. At near perpendicular write field angles, the write field required to impress magnetization reversal in the grains medium layer 34 is only slightly less than the easy axis anisotropy field. Thus, for a high coercivity medium, the write field required for reversal can be very high. However, research has shown that when a high frequency field is generated at magnetic medium 14, the field required to impress grain magnetization reversal is reduced significantly below that predicted by the Stoner-Wohlfarth model. Consequently, the coercivity of the medium layer 34 may be reduced by generating a high frequency field in medium layer 34 close to the write field generated by write pole 20 in magnetic medium 14.

In order to generate a high frequency field, write assist device 12 is provided proximate to write pole 20 and magnetic medium 14. While write assist device 12 is shown disposed proximate to the leading edge of write pole 20, write assist device 12 may also be disposed proximate to the trailing edge of write pole 20. Write assist current source 40 is connected to write pole 20 and shield 26, which also function as electrodes to carry write assist current $I_A$ to write assist device 12. In alternative embodiments, write assist current source 40 is connected to dedicated electrodes that carry write assist current $I_A$ to write assist device 12. Write assist current $I_A$ may be, for example, alternating current, direct current, or direct current with alternating current modulation. Write assist device 12 is representative of all embodiments of structures according to the present invention that are used to generate a high frequency write assist field. As will be described in more detail herein, when write assist current $I_A$ is applied perpendicular to the major plane (i.e., the x-y plane) of the layers that comprise write assist device 12, a magnetic field is generated by write assist device 12 with a frequency that is a function of the amplitude of write assist current $I_A$. The combination of the write field and the magnetic field generated by write assist device 12 overcomes the high coercivity of medium layer 40 to permit controlled writing of data to magnetic medium 14.

Figure 2:
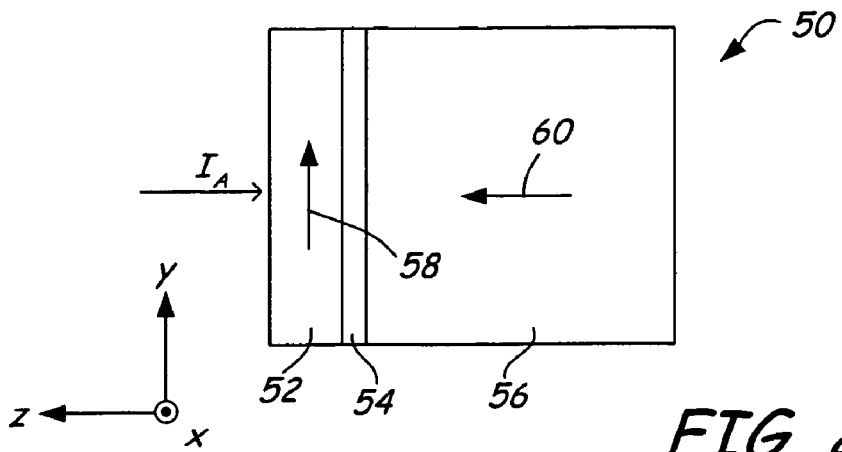
FIG. 2 is a side view of an oscillation element for providing a high frequency write assist field.

FIG. 2 is a side view of an oscillation element 50 for providing a high frequency write assist field. Oscillation element 50 is an example of a structure that may be used for write assist device 12. Oscillation element 50 includes first magnetic layer 52, nonmagnetic layer 54, and second magnetic layer 56. Write assist current $I_A$ is applied perpendicular to the major plane (i.e., the x-y plane) of the layers that comprise oscillation element 50. First magnetic layer 52 and second magnetic layer 56 may be made of materials such as Co, CoFe, CoFeB, NiFe, and alloys thereof. Nonmagnetic layer 54 may be made of materials such as Cu, Ag, Au, Pt, Ag, Cr, Ru, and Pd.

First magnetic layer 52 has a magnetization 58 in an unbiased state that is substantially parallel to the major plane of first magnetic layer 52. Magnetization 58 is free to rotate 360° about the major plane of first magnetic layer 52 (i.e., the x-y plane), and thus first magnetic layer 52 may be referred to as a magnetic free layer. Second magnetic layer 56 has a magnetization 60 that is substantially perpendicular to magnetization 58 in an unbiased state. Magnetization 60 is maintained or pinned in the direction shown and, and thus second magnetic layer 56 may be referred to as a magnetic pinned or fixed layer. In actual implementation, magnetization 58 may have an anisotropic direction that is as much as 20° from parallel with the z-axis and magnetization 60 may have an anisotropic direction that is as much as 20° from parallel with the y-axis without significantly affecting the operation of oscillation element 50. Magnetization 60 may be pinned by the high perpendicular anisotropy or the large thickness of second magnetic layer 56. Alternatively, magnetization 60 may be pinned with an external biasing structure such as a permanent magnet or a synthetic antiferromagnet. Nonmagnetic layer 54 may be a conductive material or a metallic oxide that carries write assist current $I_A$ between first magnetic layer 52 and second magnetic layer 56.

When write assist current $I_A$ is directed perpendicular to first magnetic layer 52 and second magnetic layer 56, magnetization 58 rotates about the z-axis. This is due to the spin transfer effect in which write assist current $I_A$ transfers spin angular momentum from second magnetic layer 56 to first magnetic layer 52, thereby inducing precession of magnetization 58 in first magnetic layer 52. The precession generates a microwave range voltage due to the magnetoresistive effect and, in an equilibrium state, the magnetization directly below first magnetic layer 52 (i.e., at the surface of first magnetic layer 52 that confronts magnetic medium 14) precesses uniformly and generates a magnetic field. The frequency of precession for oscillation element 50 is a function of the amplitude of write assist current $I_A$.

Figure 3:
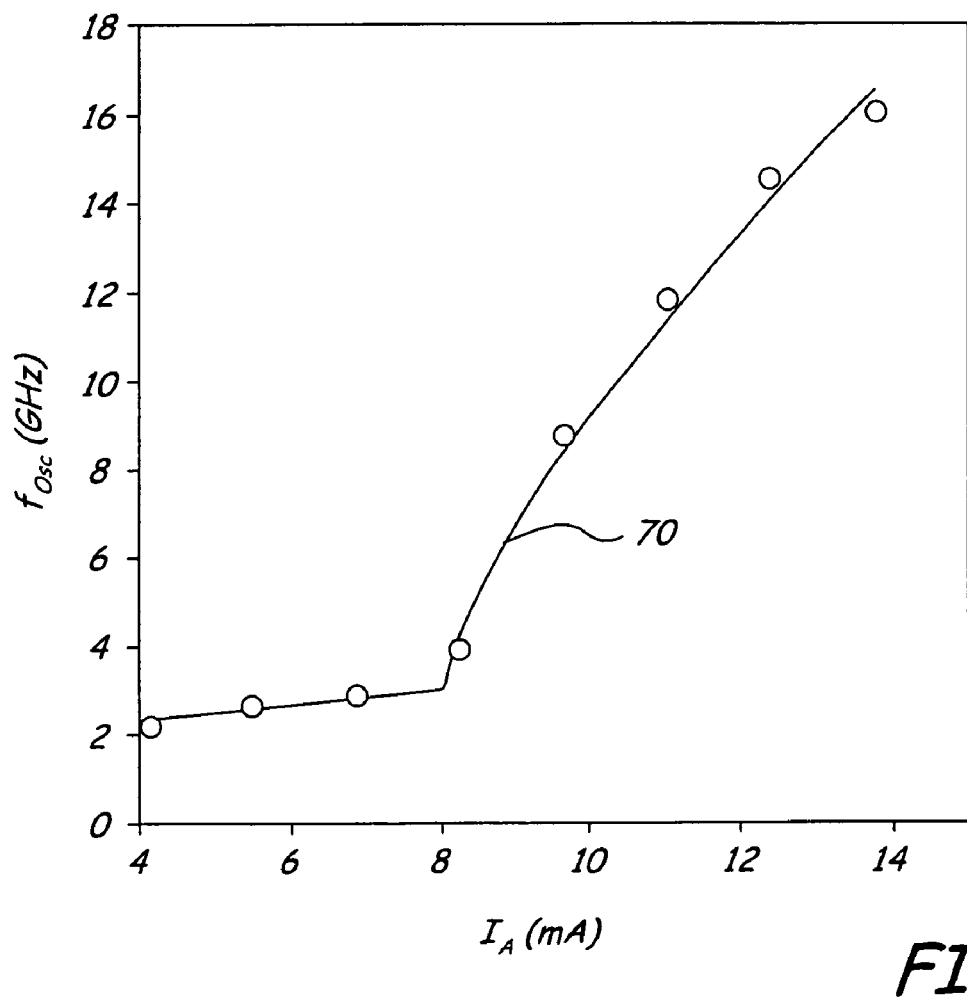
FIG. 3 is a graph of micromagnetic simulation results of applied current amplitude versus rotation frequency of the oscillation element shown in FIG. 2.

FIG. 3 is a graph of micromagnetic simulation results of the amplitude of write assist current $I_A$ versus rotation frequency $f_{OSC}$ of magnetization 58 in oscillation element 50. The graph includes best fit line 70 across several data plots that gives an estimate of the rotation frequency $f_{OSC}$ across an amplitude range for write assist current $I_A$. For write assist currents $I_A$ having an amplitude of less than about 8.0 mA, oscillation frequency $f_{OSC}$ increases only slightly with increasing amplitude. However, for write assist currents $I_A$ having an amplitude greater than about 8.0 mA, oscillation frequency $f_{OSC}$ increases at a much higher rate with increasing amplitude. Thus, a high frequency oscillation field can be generated by oscillation element 50 with a low current density. In addition, oscillation frequency $f_{OSC}$ can be precisely tuned by adjusting the amplitude of write assist current $I_A$. This allows the write assist field generated by oscillation element 50 to be selectively tuned based on the desired change in coercivity of medium layer 34.

Figure 4:
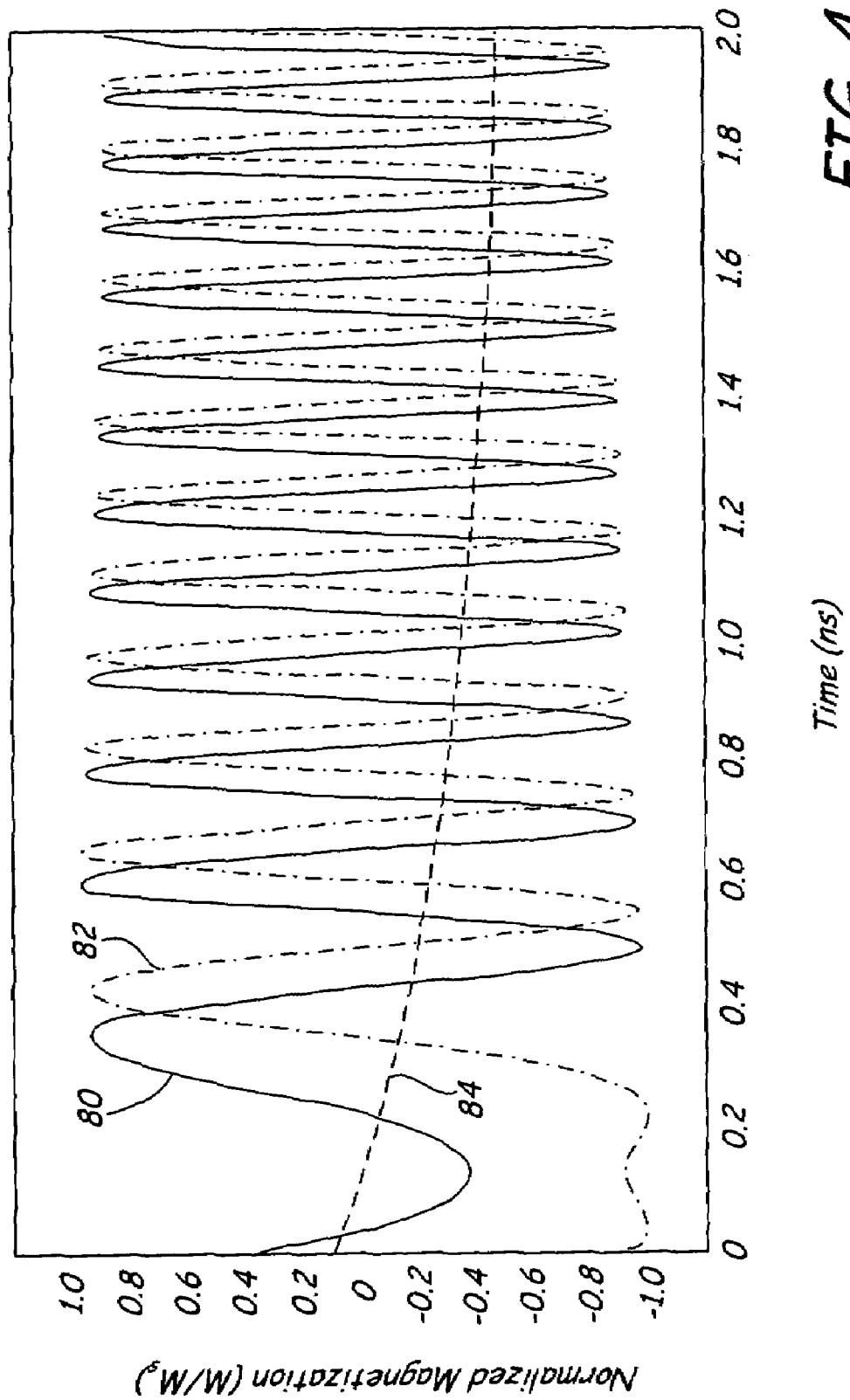
FIG. 4 is a graph of micromagnetic simulation results of the normalized magnetization versus time of the oscillation element shown in FIG. 2.

FIG. 4 is a graph of micromagnetic simulation results of the normalized magnetization $M/M_S$ versus time of the oscillation element 50. The normalized magnetization $M/M_S$ is the magnitude of magnetization 58 (M) over the saturation magnetization $M_S$ of first magnetic layer 52. The graph plots the response of first magnetic layer 52 from the time write assist current $I_A$ is applied to oscillation element 50 (0.0 ns) to when the magnetization 58 of first magnetic layer 52 approaches a steady state condition (~2.0 ns). Line 80 shows the normalized magnetization of first magnetic layer 52 in the x-direction, line 82 shows the normalized magnetization of first magnetic layer 52 in the y-direction, and line 84 shows the normalized magnetization of first magnetic layer 52 in the z-direction. As can be seen, the precession of the magnetic domains in first magnetic layer 52 causes rotation of magnetization 58 in the x-y plane. The equilibrium or steady state of magnetization 58 in first magnetic layer 52 is reached when the normalized magnetization settles or levels out to a constant value. When this occurs, oscillation of magnetization 58 occurs substantially in the x-y plane at a single frequency (about 10 GHz for the simulated device), which develops an AC field at this frequency around oscillation element 50. Magnetization 60 of second magnetic layer 56 may also rotate and develop an AC field having an amplitude less than that produced by first magnetic layer 52. The AC field generated by first magnetic layer 52 and second magnetic layer 56 is used to reduce the coercivity of medium layer 34 proximate to write pole 20.

Oscillation element 50 is the core structure used to generate a high-frequency oscillating field according to the present invention, and oscillation element 50 may be configured with other structures to provide write assist assemblies having different properties. For example, FIGS. 5, 6, and 7 show various embodiments of write assist assemblies that include multiple magnetic free layers which may be used for write assist device 12 shown in FIG. 1.

Figure 5:
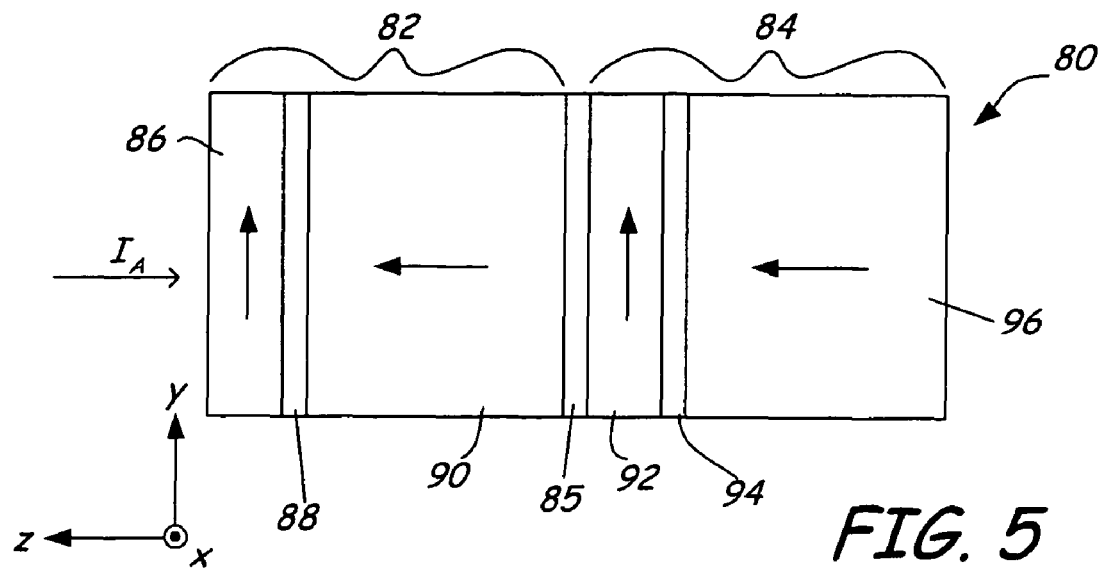
FIG. 5 is a side view of a write assist assembly including two oscillation elements disposed in series.

FIG. 5 is a side view of write assist assembly 80 including first oscillation element 82 and second oscillation element 84 connected by nonmagnetic spacer 85. First oscillation element 82 and second oscillation element 84 are disposed with respect to each other such that write assist current $I_A$ is carried serially through write assist assembly 80. First oscillation element 82 includes first magnetic layer 86, nonmagnetic layer 88, and second magnetic layer 90, while second oscillation element 84 includes third magnetic layer 92, nonmagnetic layer 94, and fourth magnetic layer 96. First magnetic layer 86 and third magnetic layer 92 are free layers, while second magnetic layer 90 and fourth magnetic layer 96 are pinned layers. The magnetizations of second magnetic layer 90 and fourth magnetic layer 96 may be pinned by the high perpendicular anisotropy of these layers, due to their large thicknesses in the z-direction of these layers, or with an external biasing structure such as a permanent magnet or a synthetic antiferromagnet. In actual implementation, first magnetic layer 86 and third magnetic layer 92 may have anisotropic magnetization directions that are as much as 20° from parallel with the z-axis, and second magnetic layer 90 and fourth magnetic layer 96 may have anisotropic magnetization directions that are as much as 20° from parallel with the y-axis without significantly affecting the operation of write assist assembly 80.

Figure 6:
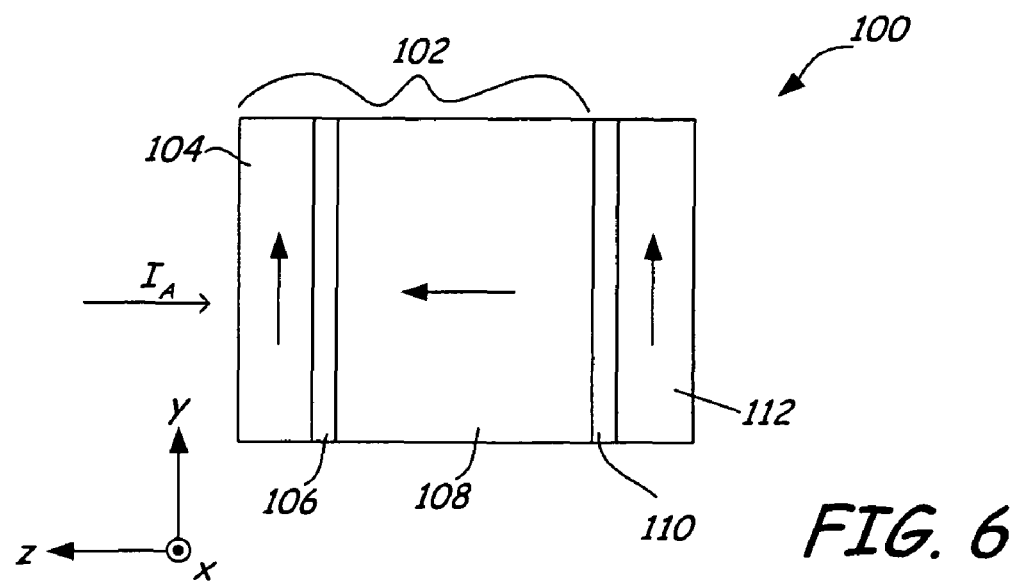
FIG. 6 is a side view of a write assist assembly including an oscillation element disposed in series with a magnetic free layer.

FIG. 6 is a side view of write assist assembly 100 including oscillation element 102 (comprising first magnetic layer 104, nonmagnetic layer 106, and second magnetic layer 108), nonmagnetic spacer 110, and third magnetic layer 112. Oscillation element 102 and third magnetic layer 112 are disposed with respect to each other such that write assist current $I_A$ is carried serially through write assist assembly 100. First magnetic layer 104 and third magnetic layer 112 are free layers, while second magnetic layer 108 is a pinned layer. The magnetization of second magnetic layer 108 may be pinned by the high perpendicular anisotropy of this layer, due to its large thickness in the z-direction of this layer, or with an external biasing structure such as a permanent magnet or a synthetic antiferromagnet. In actual implementation, first magnetic layer 104 and third magnetic layer 112 may have anisotropic magnetization directions that are as much as 20° from parallel with the z-axis, and second magnetic layer 108 may have an anisotropic magnetization direction that is as much as 20° from parallel with the y-axis without significantly affecting the operation of write assist assembly 100.

Figure 7:
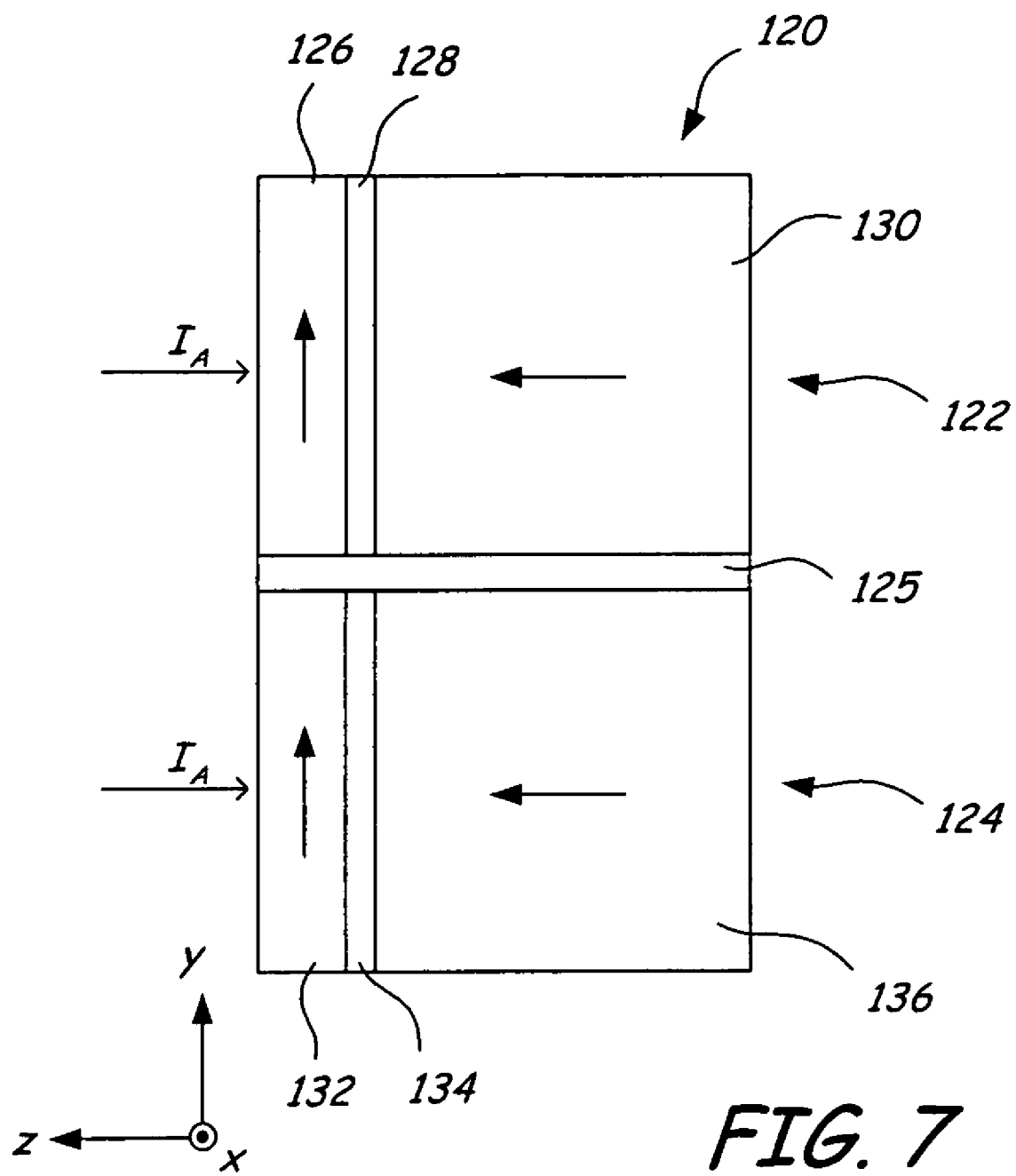
FIG. 7 is a side view of a write assist assembly including two oscillation elements disposed in parallel.

FIG. 7 is a side view of write assist assembly 120 including first oscillation element 122 and second oscillation element 124 separated by nonconducting spacer 125. First oscillation element 122 includes first magnetic layer 126, nonmagnetic layer 128, and second magnetic layer 130, while second oscillation element 124 includes third magnetic layer 132, nonmagnetic layer 134, and fourth magnetic layer 136. First magnetic layer 126 and third magnetic layer 132 are free layers, while second magnetic layer 130 and fourth magnetic layer 136 are pinned layers. The magnetizations of second magnetic layer 130 and fourth magnetic layer 136 may be pinned by the high perpendicular anisotropy of these layers, due to their large thicknesses in the z-direction of these layers, or with an external biasing structure such as a permanent magnet or a synthetic antiferromagnet. In actual implementation, first magnetic layer 126 and third magnetic layer 132 may have anisotropic magnetization directions that are as much as 20° from parallel with the z-axis, and second magnetic layer 130 and fourth magnetic layer 136 may have anisotropic magnetization directions that are as much as 20° from parallel with the y-axis without significantly affecting the operation of write assist assembly 120.

Write assist assembly 120 is configured such that write assist current $I_A$ is carried in parallel across first oscillation element 122 and second oscillation element 124. This may be accomplished by, for example, connecting the free layer end of write assist assembly 120 to write pole 20 and the pinned layer end of write assist assembly 120 to shield 26 via nonmagnetic conductor 28. Alternatively, write assist current $I_A$ may be carried by dedicated current electrodes connected in parallel from write assist current source 40 to each of first oscillation element 122 and second oscillation element 124. In FIG. 7, the edge surface defined by layers 132, 134, and 136 confronts magnetic medium 14.

When write assist current $I_A$ is directed perpendicularly through write assist assemblies 80, 100, and 120, the free layers of the write assist assemblies respond similarly to first magnetic layer 52 described with regard to FIG. 2. In particular, the magnetizations of the free layers rotate about the z-axis due to the spin transfer effect in which write assist current $I_A$ transfers spin angular momentum from the pinned layers to the free layers, thereby inducing precession of the free layer magnetization. The frequency of precession is a function of the amplitude of write assist current $I_A$.

When write assist current $I_A$ is passed through write assist assemblies 80, 100, or 120, each free layer responds with a frequency of rotation that is substantially similar with respect to the other free layer(s) in the assembly. However, the rotational frequency of each free layer may be out of phase with respect to the other free layers in the assembly. As the free layers settle into their steady state frequencies of rotation, the demagnetization field or exchange coupling by each free layer interact with the other free layers in the write assist assembly. This interaction induces the frequencies of rotation of the free layers in the write assist assembly to phase lock or synchronize with respect to each other, which is a general tendency of interacting, nonlinear oscillator systems. The combined power of write assist assemblies 80, 100, and 120 in the phase-locked state is the sum of the individual power of each oscillating free layer. Thus, the incorporation of additional free layers or additional oscillation elements including a free layer results in an increase in the AC field output by the write assist assemblies. As a result, the strength of the write assist field can be increased without requiring an increase in the amplitude of write assist current $I_A$, thereby reducing the power consumption of the overall system.

In summary, the present invention relates to a magnetic writer that includes a write element and an oscillation device disposed adjacent to the write element. The first oscillation device includes a first magnetic layer, a second magnetic layer having a magnetization vector including a component perpendicular to a major plane of the first magnetic layer. The first nonmagnetic layer disposed between the first magnetic layer and the second magnetic layer. The first oscillation device generates a high-frequency oscillation field when a current is directed perpendicular to the major plane of the first magnetic layer. The high-frequency oscillation device generates a large high-frequency oscillation field with a low current density, and the oscillation can be tuned by varying the applied current density. In addition, the device is configurable to generate a phase locked field to provide increased efficiency in the energy transfer rate and a highly controllable oscillation frequency during the writing process.

Although the present invention has been described with reference to preferred embodiments, workers skilled in the art will recognize that changes may be made in form and detail without departing from the spirit and scope of the invention.

The invention claimed is:

1. A magnetic writer comprising:
   a write element; and
   a first oscillation device disposed adjacent to the write element, wherein the first oscillation device includes a first magnetic layer, a second magnetic layer having a magnetization vector including a component perpendicular to a major plane of the first magnetic layer, a first nonmagnetic layer disposed between the first magnetic layer and the second magnetic layer, and a third magnetic layer disposed adjacent to the second magnetic layer on a side opposite the first nonmagnetic layer, the third magnetic layer having a magnetization direction that is substantially parallel to a magnetization direction of the first magnetic layer, wherein the first oscillation device generates a high-frequency oscillation field when a current is directed perpendicular to the major plane of the first magnetic layer.

2. The magnetic writer of claim 1, wherein the frequency of the high-frequency oscillation field is related to an amplitude of the current.

3. The magnetic writer of claim 2, wherein the high-frequency oscillation field has a frequency of at least 1.0 GHz.

4. A magnetic writer comprising:
   a write element;
   a first oscillation device disposed adjacent to the write element, wherein the first oscillation device includes a first magnetic layer, a second magnetic layer having a magnetization vector including a component perpendicular to a major plane of the first magnetic layer, and a first nonmagnetic layer disposed between the first magnetic layer and the second magnetic layer, wherein the first oscillation device generates a high-frequency oscillation field when a current is directed perpendicular to the major plane of the first magnetic layer; and
   a second oscillation device disposed adjacent to the first oscillation device and including a third magnetic layer, a fourth magnetic layer having a magnetization vector including a component perpendicular to a major plane of the third magnetic layer, and a second nonmagnetic layer disposed between the third magnetic layer and the fourth magnetic layer, wherein the current is directed perpendicular to the major plane of the third magnetic layer.

5. The magnetic writer of claim 4, wherein the second oscillation device is disposed in series with the first oscillation device.

6. The magnetic writer of claim 4, wherein the second oscillation device is disposed in parallel with the first oscillation device.

7. The magnetic writer of claim 4, wherein the high-frequency oscillation fields generated by the first and second oscillation devices are phase locked.

8. A magnetic writer comprising:
   a write element that produces a write field through a front surface; and
   a first oscillation device disposed adjacent to the write element at the front surface, wherein the first oscillation device includes a first magnetic layer, a second magnetic layer having a magnetization direction substantially perpendicular to a major plane of the first magnetic layer, a first nonmagnetic layer disposed between the first magnetic layer and the second magnetic layer, and a third magnetic layer disposed adjacent to the second magnetic layer on a side opposite the first nonmagnetic layer, the third magnetic layer having a magnetization direction that is substantially parallel to a magnetization direction of the first magnetic layer;
   wherein the first oscillation device generates a high-frequency oscillation field that assists the write field when a current is directed perpendicular to the major plane of the first magnetic layer.

9. The magnetic writer of claim 8, wherein the current is selected from the group consisting of direct current, alternating current, and direct current with alternating current modulation.

10. The magnetic writer of claim 8, wherein at least one of the first and second magnetic layers is comprised of a material selected from the group consisting of Co, CoFe, CoFeB, NiFe, and alloys thereof.

11. The magnetic writer of claim 8, wherein the first nonmagnetic layer is comprised of a material selected from the group consisting of Cu, Ag, Au, Pt, Ag, Cr, Ru, and Pd.

12. A magnetic writer comprising:
   a write element that produces a write field through a front surface;
   a first oscillation device disposed adjacent to the write element at the front surface, wherein the first oscillation device includes a first magnetic layer, a second magnetic layer having a magnetization direction substantially perpendicular to a major plane of the first magnetic layer, and a first nonmagnetic layer disposed between the first magnetic layer and the second magnetic layer; and wherein the first oscillation device generates a high-frequency oscillation field that assists the write field when a current is directed perpendicular to the major plane of the first magnetic layer; and
   a second oscillation device disposed adjacent to the first oscillation device and including a third magnetic layer, a fourth magnetic layer having a magnetization direction substantially perpendicular to a major plane of the third magnetic layer, and a second nonmagnetic layer disposed between the third magnetic layer and the fourth magnetic layer, wherein the current is directed perpendicular to the major plane of the third magnetic layer.

13. The magnetic writer of claim 12, wherein the second oscillation device is disposed in series with the first oscillation device.

14. The magnetic writer of claim 12, wherein the second oscillation device is disposed in parallel with the first oscillation device.

15. The magnetic writer of claim 12, wherein the high-frequency oscillation fields generated by the first and second oscillation devices are phase locked.

16. A magnetic writing system comprising:
a magnetic medium;
a write element disposed adjacent to the magnetic medium that produces a write field through a medium confronting surface; and
a first oscillation device disposed adjacent to the write element at the medium confronting surface, wherein the first oscillation device includes a first magnetic layer, a second magnetic layer having a magnetization direction substantially perpendicular to a major plane of the first magnetic layer, a first nonmagnetic layer disposed between the first magnetic layer and the second magnetic layer, and a third magnetic layer disposed adjacent to the second magnetic layer on a side opposite the first nonmagnetic layer, the third magnetic layer having a magnetization direction that is substantially perpendicular to the magnetization direction of the second magnetic layer;
wherein the first oscillation device generates a high-frequency oscillation field that reduces the coercivity of the magnetic medium proximate to the write element when a current is directed perpendicular to the major plane of the first magnetic layer.

17. The magnetic writing system of claim 16, wherein the frequency of the high-frequency oscillation field is related to an amplitude of the current.

18. The magnetic writing system of claim 16, and further comprising:
a fourth magnetic layer having a magnetization direction substantially perpendicular to a major plane of the third magnetic layer; and
a second nonmagnetic layer disposed between the third magnetic layer and the fourth magnetic layer.

19. The magnetic writing system of claim 16, wherein the current is selected from the group consisting of direct current, alternating current, and direct current with alternating current modulation.

20. A magnetic writing system comprising:
a magnetic medium;
a write element disposed adjacent to the magnetic medium that produces a write field through a medium confronting surface;
a first oscillation device disposed adjacent to the write element at the medium confronting surface, wherein the first oscillation device includes a first magnetic layer, a second magnetic layer having a magnetization direction substantially perpendicular to a major plane of the first magnetic layer, and a first nonmagnetic layer disposed between the first magnetic layer and the second magnetic layer; and wherein the first oscillation device generates a high-frequency oscillation field that reduces the coercivity of the magnetic medium proximate to the write element when a current is directed perpendicular to the major plane of the first magnetic layer;
a third magnetic layer;
a fourth magnetic layer having a magnetization direction substantially perpendicular to a major plane of the third magnetic layer; and
a second nonmagnetic layer disposed between the third magnetic layer and the fourth magnetic layer;
wherein the third magnetic layer is disposed relative to the first magnetic layer such that the current is directed in parallel perpendicular to the major planes of the first and third magnetic layers.

* * * * *